Patented Jan. 2, 1945

2,366,179

UNITED STATES PATENT OFFICE 2,366,179

AMINO TRIPHENYLACETONITRILE AND A PROCESS OF MAKING IT

Lyman Chalkley, Brick Township, Ocean County, N. J.

No Drawing. Application July 23, 1943, Serial No. 495,850

2 Claims. (Cl. 260—391)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928, (Ch. 460, 45 Stat. L. 467).

This invention relates to new chemical compounds and to a novel process for their preparation. More particularly, this invention is concerned with new chemical compounds containing the nuclear-substituted aminotriphenylmethyl group.

It is an object of this invention to prepare new substituted aminotriphenylmethyl compounds. Another object is to prepare relatively colorless dyestuff intermediates. A further object is to provide a novel process for carrying out the nuclear substitution of aminotriphenylmethyl compounds in which the substitution is induced at the 3-position. Other and more specific objects will be apparent or become known as the ensuing description proceeds.

These objects are accomplished in accordance with this invention wherein nuclear-substituted triphenylmethyl compounds are prepared by treating at a temperature not higher than 10° C. while excluding actinic radiation, a relatively colorless compound having an aminotriphenylmethyl group united to a negative radicle, with a reagent from the class of halogenating agents and nitrating agents, and then separating the formed nuclear-substituted derivative.

By the process of this invention, new chemical compounds are provided wherein a negative radicle is united to an aminotriphenylmethyl group and wherein at least one of the phenyl residues is substituted at the 3-position by a substituent from the group consisting of halogen and nitro.

While the invention is not limited to any particular theory of reaction, it is thought that the combination of conditions employed, namely, exclusion of actinic light and maintenance of a very low reaction temperature, preferably below 10° C., induces nuclear substitution at the 3-position while at the same time represses degradation of the initial materials and also represses, during reaction, the formation of the relatively unstable dyestuffs.

Suitable aminotriphenylmethyl compounds for substitution in accordance with the present invention are compounds having the formula:

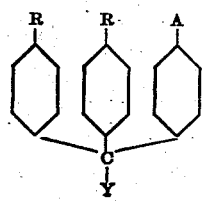

wherein A is in amino group, R is from the class of hydrogen and an amino group, and Y is a negative radicle. The negative radicle, Y, can be nitrilo, hydroxy, alkoxy, aralkoxy, acyl, aroyl, and similar negative radicles. The amino groups in the foregoing formula can be NH₂, or a similar amino radicle in which one or both of the amino hydrogen atoms is substituted by an aliphatic group such as, for example, the amino groups corresponding to mono- and di-methyl, ethyl, propyl, butyl, and amyl amines. Representative aminotriphenylmethyl compounds within the foregoing classification include 4,4',4''-triaminotriphenylacetonitrile; 4,4',4''-tris - dimethylaminotriphenylacetonitrile; 4,4',4''-tris - monoethylaminotriphenylacetonitrile; 4,4', - bis-aminotriphenylacetonitrile; 4,4'-bis-monomethylaminotriphenylacetonitrile; 4,4',- bis - dimethylaminotriphenylacetonitrile; 4,4',-bis-diethylaminotriphenylacetonitrile and other aminotriarylmethyl compounds, in which the nitrile group of the listed representative compounds is replaced by a negative group such as methoxy, ethoxy, propoxy, benzyl, naphthyl, beta-phenylethoxy, acetyl, propionyl, acrylyl, butyryl, benzoyl, cinnamyl, and similar negative radicles. The foregoing compounds are all relatively colorless, by which is meant that they are not themselves dyestuffs without further chemical reaction.

Suitable halogenating and nitrating agents for use in accordance with the present invention include molecular halogens such as chlorine, bromine, and fluorine; nitrating agents such as a mixture of concentrated nitric and sulfuric acids, and nitric oxides; alkali hypohalogenites such as sodium hypochlorite, hypobromite and the like; the usual fluorinating agents such as borontrifluoride, and fluoro-boric acid; and other known halogenating and nitrating agents.

The aminotriphenylmethyl compounds are subjected to reaction with halogenating or nitrating agents at a relatively low temperature, generally not higher than 10° C. and preferably within the more restricted range of minus-30° C. to plus-5° C. Suitable low-freezing solvents and diluents may be employed to prevent solidification of the reaction mixture at the reaction temperatures employed, including lower aliphatic esters, ethers, alcohols, ketones and hydrocarbons, as for example, methanol, ethanol, propanol, dimethyl ether, diethyl ether, acetone, benzene, and the like.

During the course of the reaction, actinic radiation, particularly ultraviolet light and strong artificial light, is excluded from the reaction mixture, in order to prevent the formation of unstable colored compounds. Known methods for excluding actinic radiation are employed, such as for example, carrying out the reaction in a dark room, the use of light-proof reaction vessels, and the like. However, excluding bright sunlight, strong artificial light, and particularly ultra violet light, is generally satisfactory, and diffused daylight of a low order may not be exceptionally detrimental even though reducing the reaction efficiency somewhat.

The following examples illustrate how the invention may be carried out, but it is not limited thereto. Parts are by weight unless otherwise designated, and the indicated temperatures are on the centigrade scale:

*Example 1*

A solution of 4 grams (1/100 mole) of 4,4',4''-tris-dimethylaminotriphenylacetonitrile in 25 cc. of concentrated hydrochloric acid, specific gravity 1.2, is diluted with 50 cc. of water, cooled to −1° C. and treated in the absence of ultra violet light with 40 cc. (3/100 mole) of an equally cold 5.58% solution of sodium hypochlorite in small portions with constant stirring. After the addition of the hypochlorite solution has been completed the mixture is kept cold for 1 hour and then allowed to warm up to room temperature. The mixture is treated with 4 normal sodium hydroxide solution until the hydrogen ion concentration has been reduced to about pH 0.6 to pH 0.8. This point corresponds to the turning of malachite green, used as an indicator, from yellow to yellowish green. The solution is filtered to remove the small amount of precipitate formed during the reaction. The filtrate is mixed with 40 cc. of sodium acetate solution containing 0.5 gram of sodium acetate per cc., whereupon practically pure trichloro-4,4',4''-tris-dimethylaminotriphenylacetonitrile is precipitated. The precipitate is collected, washed with water and dried.

For complete purification, one part of the crude product is redissolved in approximately 10 parts of ethyl acetate, cooled to 0° C. for 2 hours, and precipitated impurities removed by filtration. The pure product is then crystallized from the filtrate by adding an equal volume of 95% methyl alcohol ("Columbian spirits"), and cooling the mixture in darkness to 0° C. for two days. The well crystallized white precipitate is collected, washed with methyl alcohol and dried. It melts at 202–3°, corrected, and has the structural formula:

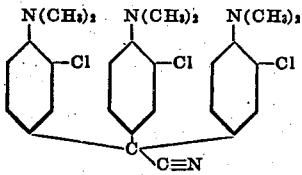

3,3',3'' trichloro-4,4',4'' tris-dimethylaminotriphenylacetonitrile

*Example 2*

A solution of 8 g. (2/100 mole) of 4,4'-bis-diethylaminotriphenylcarbinol in 60 cc. of benzene is cooled to −10° in a freezing mixture and treated with a freshly prepared solution, also at −10°, of 4.8 g. (3/100 mole) bromine in 32 cc. of benzene. The bromine solution is added all at once with vigorous shaking. A precipitate believed to be the hydrobromide of brominated brilliant green carbinol, appears in the reaction mixture.

The mixture is allowed to stand in the freezing mixture for 5 minutes, then the benzene is filtered off, and the residue is covered in a beaker with a mixture of 80 cc. of 95% methyl alcohol and 16 cc. of 4 normal aqueous potassium hydroxide solution. The hydrobromide mixture is immediately decomposed with the formation of the amine and potassium bromide. The dark colored mixture is largely evaporated in the air, water is added and brought to a boil to remove the last of the benzene, and the thick tarry residue separated from the aqueous layer containing potassium bromide and hydroxide, and washed with water.

The tarry residue is taken up in 80 cc. of 95% methyl alcohol, treated with charcoal, filtered, and the filter washed with 20 cc. of alcohol which is added to the filtrate. One volume (100 cc.) of water and 15 cc. of 4 normal sodium chloride solution is added and the mixture allowed to stand for 24 hours. The alcoholic layer is decanted from the oil which has separated. This oil is washed with water and taken up in 50 cc. of boiling normal aqueous hydrochloric acid. The resulting solution is cooled to room temperature, mixed with 100 cc. of ½ molar sodium sulfate solution, and filtered immediately from any precipitated tar. The filtrate is diluted with 400 cc. of water, and heated to 85°. During the heating, there is precipitated as a thick oil, dibromo-brilliant green carbinol having the structural formula:

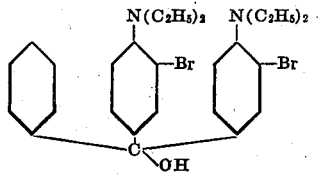

3,3'-dibromo-4,4'-bis-diethylaminotriphenylcarbinol

When mixed with ½ normal hydrochloric acid, the carbinol forms a not very deeply colored solution which dyes silk a blue green that is more blue in tone than the color produced by brilliant green.

To form the mono-bromo derivative, the solution is cooled, decanted from the dibromo-brilliant green carbinol and treated with 25 cc. of 4 normal sodium hydroxide solution. An oil separates. After standing for 16 hours, the solution is decanted from this oil, the oil is washed with water, taken up in 50 cc. of ½ normal aqueous hydrochloric acid, the solution filtered and treated with 10 cc. of 4 normal sodium hydroxide. The mixture is chilled in ice, the solution decanted from the stiff oil, and this oil washed with water and dried in thin layers in the air. The resulting dark-green, viscous oil is the monobromo-brilliant green carbinol, having the structural formula:

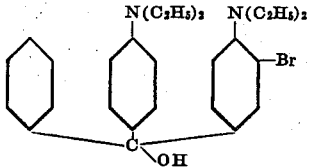

3-bromo-4,4'-bis-diethylaminotriphenylcarbinol

When taken up in a small amount of glacial acetic acid and the solution diluted with water, or when dissolved in N/10 hydrochloric acid, the carbinol gives a not very deeply colored solution which dyes silk a blue green that is a trifle more blue than the color produced by brilliant green, but less blue than the color produced by the dibromo-brilliant green.

Example 3

A solution of ⅗ g. (¹⁄₁₀₀ mole) of 4,4'-bis-dimethylaminotriphenylacetonitrile in 25 cc. of 70% sulfuric acid is cooled to 5° C. and treated in the absence of ultra violet light in a similarly cooled solution of 1.25 cc. (²⁄₁₀₀ mole) of 71% nitric acid in 10 cc. of 70% of sulfuric acid. The nitric acid solution is added slowly with constant stirring over a period of about 20 minutes. On completion of the addition of the nitric acid, the solution is held in the cooling bath for an hour and then allowed to warm slowly to room temperature. After standing at room temperature for 16 hours the solution is warmed and held at 60° for 30 minutes. The solution is then poured into 10 volumes (350 cc.) of water. The voluminous yellow precipitate which forms is collected, washed thoroughly and dried.

For purification, the precipitate is dissolved in ethyl acetate in the proportion of 20 g. of precipitate to 100 cc. of ethyl acetate. The solution is decanted from a slight gummy residue, and diluted with 2 volumes of 95% methyl alcohol. The solution is allowed to stand for 24 hours, and the brilliant orange crystals which form during this time collected, washed with alcohol and dried. The substance melts at 157–8°, corrected. It is dinitro - 4,4' - bis - dimethylaminotriphenylacetonitrile, and has the structural formula:

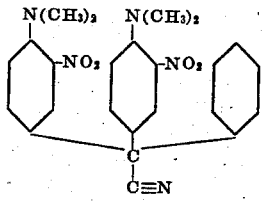

3,3'-dinitro-4,4'-bis-dimethylaminotriphenylacetonitrile

The nitro compound is readily reduced to the amino compound with zinc and hydrochloric acid, and thus can serve as the starting point in the preparation of a series of indirect substitution products.

Example 4

A solution of 4 g. (¹⁄₁₀₀ mole) of 4,4',4"-tris-dimethylaminotriphenylmethylmethylether in 50 cc. of carbon tetrachloride is cooled to −20° C. and treated rapidly, under vigorous stirring, in weak artificial light only, with an equally cold solution of 2.13 g. (³⁄₁₀₀ mole) of chlorine in 35 cc. of carbon tetrachloride. The stirring is continued for 3 minutes after the addition of the chlorine, and the mixture then shaken with a cold solution of 15 cc. of 4 normal potassium hydroxide diluted to 65 cc. with water. The carbon tetrachloride layer is separated and the carbon tetrachloride evaporated. The residual oily material is washed with warm, dilute potassium hydroxide solution, then with water, and, after drying, is dissolved in a boiling mixture of 10 cc. of water and 20 cc. of acetic acid.

The resulting intensely colored solution is treated with 75 cc. of warm water, whereupon an oil is precipitated. This oil stiffens on cooling. It is washed with water and dissolved in 40 cc. of 3 normal aqueous hydrochloric acid. This solution is treated with 18 cc. of 6 normal sodium acetate solution, and filtered from the slight amount of highly chlorinated tarry material which is precipitated. The filtrate is treated with 12 cc. more of 6 normal sodium acetate solution, whereupon the crude trichloro-crystal violet carbinol is precipitated. This has the structural formula:

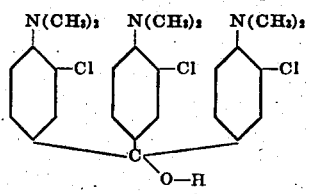

3,3',3" trichloro-4,4',4"-tris-dimethylaminotriphenylcarbinol

The precipitate is collected, washed with water and dissolved in 50 cc. of ethyl acetate. This solution is treated with charcoal, filtered, and the ethyl acetate evaporated from the filtrate. The glass-like residue is dissolved in 10 cc. of acetic acid, the solution filtered and the filtrate thrown into 200 cc. of water. The precipitated carbinol is collected and dried. It may be further purified by recrystallization from aqueous methyl alcohol.

The carbinol is colorless. It is quite insoluble in water and is water repellant. It is readily soluble in most organic solvents, as, for example, absolute methyl-, ethyl-, and isopropyl-alcohols, acetone, ethyl acetate, benzene, toluene; and, especially when slightly impure, has a tendency to hold solvents tenaciously, forming thick, tacky, resinous masses.

The solution in cold acetic acid is at first light colored, but on standing or warming it becomes an intense pure blue. The carbinol is readily soluble in dilute aqueous hydrochloric acid if it is first dissolved in a little alcohol or acetic acid. The resulting solution is not deeply colored, especially in the presence of sodium chloride, but it readily dyes silk. The formula of the dye is:

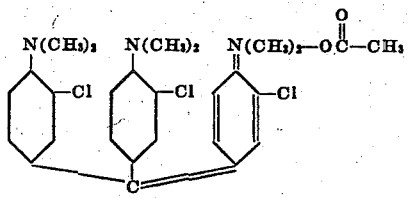

3,3',3" trichloro-crystal-violet acetate

The filtrate when treated with ¼ of its volume of 4 normal sodium chloride solution readily dyes silk blue—a bluer tone than given by crystal violet. The carbinol may be precipitated from the dye solution by treatment with excess of sodium hydroxide solution.

In the present example the reaction was carried out with the methyl ether in the non-ionizing solvent, carbon tetrachloride, at a low temperature under very low diffused artificial light at which the conversion of the ether into the dye is very much slower than the substitution reaction. The use of elementary chlorine as the chlorinating agent, and of organic solvents, made it unnecessary to add any acid to the original reaction mixture. The only acid present was that formed by the substitution reaction itself.

It will be apparent from the foregoing description and illustrative examples that a novel process for the preparation of nuclear substituted aminotriarylmethyl compounds in which substitution is made to take place at the 3-position, that is, meta to the nuclear carbon atom attached to the common methyl group, has been provided. The novel process is effected through the cooperative action of low temperatures and the exclusion of actinic radiation. The nuclear substitution products procured are themselves novel and have great utility as dye intermediates, in the photographic arts, as pharmaceuticals, as anti-oxidants for the stabilization of rubber, fatty oils, food-stuffs, and the like, but their utility is not limited to any particular use.

This application is in part a continuation of my application Serial No. 309,107, filed December 13, 1939, now United States Patent Number 2,325,038, issued July 27, 1943.

Since many apparently widely differing embodiments will be apparent to one skilled in the art, it is obvious that various changes may be made in the specific details of the invention without departing from the spirit and scope thereof.

What is claimed is:

1. 3,3'-dinitro-4,4'-bis-dimethylaminotriphenylacetonitrile.

2. A process for preparing a substituted aminotriphenylmethyl compound which comprises subjecting to reaction at a temperature not higher than 10° C. while excluding actinic radiation, a mixture of a nitrating agent with 4,4'-bis-dimethylamino-triphenylacetonitrile and separating the formed nitro derivative.

LYMAN CHALKLEY.